(12) United States Patent
Hansen

(10) Patent No.: US 7,587,196 B2
(45) Date of Patent: Sep. 8, 2009

(54) WIRELESS POINT OF SALE TRANSACTION

(75) Inventor: Thomas J. Hansen, Aalborg Ost (DK)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 636 days.

(21) Appl. No.: 10/472,966

(22) PCT Filed: Mar. 5, 2002

(86) PCT No.: PCT/EP02/02461
§ 371 (c)(1), (2), (4) Date: Jun. 24, 2004

(87) PCT Pub. No.: WO02/080120
PCT Pub. Date: Oct. 10, 2002

(65) Prior Publication Data
US 2004/0243517 A1 Dec. 2, 2004

Related U.S. Application Data

(60) Provisional application No. 60/304,071, filed on Jul. 11, 2001.

(30) Foreign Application Priority Data

Mar. 29, 2001 (DK) .............................. 2001 00520
Apr. 9, 2001 (DK) .............................. 2001 00582
Jul. 5, 2001 (EP) .................................. 01610070

(51) Int. Cl.
H04M 11/00 (2006.01)

(52) U.S. Cl. ......................................... 455/406; 705/64
(58) Field of Classification Search ................... 705/64, 705/39, 67
See application file for complete search history.

(56) References Cited

U.S. PATENT DOCUMENTS

| 6,175,922 | B1 | 1/2001 | Wang | |
| 2001/0037312 | A1* | 11/2001 | Gray et al. | 705/67 |
| 2002/0107791 | A1* | 8/2002 | Nobrega et al. | 705/39 |
| 2008/0033869 | A1* | 2/2008 | Steele et al. | 705/38 |

FOREIGN PATENT DOCUMENTS

| EP | 1017029 A2 | 7/2000 |
| WO | WO 00/74424 A1 | 12/2000 |
| WO | WO 01/17298 A1 | 3/2001 |

* cited by examiner

Primary Examiner—Lester Kincaid
Assistant Examiner—Phuoc Doan
(74) Attorney, Agent, or Firm—Nixon & Vanderhye P.C.

(57) ABSTRACT

A transaction request by a first customer device is processed by a transaction system. The transaction request is approved by transmitting a data signal from the first customer device to the transaction system via a wireless communications link. Respective wireless communications links are established between the transaction system and a number of customer devices corresponding to respective customers. The first customer device is identified among the number of customer devices having established respective wireless communications links as being a customer device carried by a selected customer.

21 Claims, 7 Drawing Sheets

WIRELESS POINT OF SALE TRANSACTION

This application is the U.S. national phase of international application PCT/EP02/02461, filed Mar. 5, 2002, which designated the U.S. Priority is claimed to U.S. provisional patent application 60/304,071, filed Jul. 11, 2001. This invention relates to the processing of a transaction request by a customer device and a transaction system.

FIELD OF THE INVENTION

This invention relates to the processing of a transaction request by a customer device and a transaction system.

BACKGROUND

Electronic transaction systems, such as credit card terminals with a card reader physically connected to a point of sale (POS) system, are known. The increasing availability of mobile terminals, such as mobile phones, have made it desirable to utilise mobile terminals for performing transactions like the payment for goods. U.S. Pat. No. 6,175,922 describes a method of approving a transaction request between a POS system and a portable electronic customer device, where the customer device receives a request for approving a transaction via a wireless communications link and, in response to an input from a user, approval data is returned from the electronic customer device to the POS system.

However, the above prior art method involves the problem that it requires a long time for checking out a given customer. When the customer reaches the check-out counter and it is his turn to pay, the cashier needs to enter a unique ID of the portable customer device, such as a phone number, into the POS system in order to enable the POS to establish the wireless communications link with the customer device. Alternatively, the customer needs to enter a unique transaction ID or POS ID into the portable customer device for the customer device to be able to contact the POS. Hence, this procedure involves the disadvantage that the time necessary from when the customer reaches the check-out counter until the actual transaction may be performed is rather long, thereby reducing the throughput of the POS. Furthermore, if a unique POS ID, such as a phone number, is used for an identification of the POS, there is a risk that another customer attempts to communicate with the same POS at the same time, resulting in a race condition. This may cause the transaction request to be sent to a wrong customer device, causing erroneous transactions and/or the need to repeat a transaction, resulting in increased transaction times and reducing the reliability of the method.

SUMMARY

The above and other problems are solved by a method of processing a transaction request by a first customer device and a transaction system, the transaction request being approved by transmitting a first data signal from the first customer device to the transaction system via a wireless communications link; the method comprising the steps of establishing respective wireless communications links between the transaction system and a number of customer devices corresponding to respective customers; and identifying the first customer device among the number of customer devices having established respective wireless communications links as being a customer device carried by a selected customer.

An advantage of the technology is that it provides short transaction times. A number of communications links are established to a number of customer devices and, subsequently, the customer device corresponding to a specific customer is identified among the possible customer devices which already have a communications link established. Hence, the actual transaction between the POS system and a given customer may proceed immediately after the customer has been associated with one of the customer devices currently in contact to the POS system. The establishment of the communications link may already be performed while the customer is waiting in line and does not need to await a unique identification, thereby yielding a short check-out time. Short check-out times are desirable, as they increase the efficiency of a POS, thereby reducing costs and increasing customer satisfaction.

It is a further advantage that possible race conditions are avoided since multiple customers are allowed to access the payment system simultaneously, and the correct customer device is subsequently identified. Consequently, the techology provides a reliable method of performing wireless transactions.

The term customer device comprises any electronic device which may be carried by the customer, attached to a shopping cart, or the like. Examples of customer devices comprise mobile terminals, such as mobile telephones, Personal Digital Assistants (PDA), communicators, other hand-held computers, or the like. As the customer device may comprise security sensitive information, such as credit card numbers, digital signatures, PIN-codes, or the like, the customer device is, preferably, a personal device or a device which may be personalised, e.g. by inserting a personalised module, e.g. a storage and/or processing module such as a smart card, a SIM card or the like. It is advantageous to use a customer's personal device, e.g. the customer's mobile telephone or PDA, as a customer device, since the customer is familiar with the use of the device and since he trusts the device, thereby ensuring an efficient use of the device. In the following the customer device will also be referred to as a PTD (Personal Trusted Device).

The transaction system may be any electronic system for performing electronic transactions, for example an electronic POS system, a cash register, a vending machine, a check-out system, a check-in system, a network of POS systems connected to a central server computer via a computer network, or the like. The transaction system may be operated by a shop assistant or the like, or it may be an automated self-service system, such as a vending machine, a check-out system in a self-scan scenario, or the like.

Correspondingly, the transaction may comprise the transfer of money from one account to another, e.g. in order to pay for goods or services in a retail store.

It is an advantage of the technology, that it allows customers to use a customer device to instead of a traditional credit card, otherwise leaving the customer's shopping experience unchanged. Examples of other transactions include the transfer of data, the use of tokens, e.g. bonus or credit points, etc.

The wireless communications links may be based on any suitable wireless communications technology, e.g. radio-based communication or communication using other electromagnetic radiation, e.g. infrared radiation. Preferably the communications links are short-range communications links operating in a sufficient range around the transaction system. Examples of known communications standards for short range wireless communications comprise Bluetooth and IrDA (Infrared Data Association). This has the further advantage that the communications links do not have to be established via any network provider, and that the communication only requires little power provided by the customer device.

Preferably, the communication utilises one or more suitable communications protocols and/or standards. Examples of such standards include Transmission Control Protocol (TCP), Internet Protocol (IP), User Datagram Protocol (UDP), Wireless Application Protocol (WAP), Wireless Transport Layer Security (WTLS), Wireless Identity Module (WIM), Wireless Public Key Infrastructure (WPKI), Mobile electronic Transaction (MeT) initiative, Hypertext Markup Language (HTML), Extensible Markup Language (XML), Hypertext Transfer Protocol (HTTP), Secure Hypertext Transfer Protocol (HTTPS), Secure Sockets Layer (SSL), etc.

A communications link is already established when it is the customer's turn to pay, thereby saving considerable time. Furthermore, the waiting in line appears shorter as the customer is occupied during the time it takes to initiate the payment process.

Furthermore, the waiting time may be further utilised to perform other tasks such as identifying prior sales performed with that customer device, credit checking, etc. As these tasks may be performed prior to the customer approaching the counter, the actual time needed for the actual check-out is further reduced.

In a preferred example embodiment, the step of identifying the first customer device further comprises the steps of
  assigning respective identifiers to each of the number of customer devices by the transaction system, a first identifier being assigned to the first customer device;
  transmitting the respective identifiers from the transaction system to the corresponding customer devices via the corresponding wireless communications links; and
  using the first identifier to identify the first customer device carried by the selected customer.

Consequently, when a communications link is established, an identifier is transmitted to the customer device, preferably while the customer is still waiting in line. As the identifier does not need to uniquely identify a transaction but only identify a customer device among the customer devices which are currently connected to the POS, the identifier may be rather short, preferably less than five characters.

In a further preferred example embodiment the step of using the first identifier to identify the first customer device comprises the steps of
  presenting the first identifier to the selected customer by the first customer device; and
  receiving a first input by the transaction system from a user of the transaction system, the first input being indicative of the first identifier.

This has the advantage that it provides a fast way of selecting the right customer. At the same time the anonymity of the customer is preserved as no information about the customer, such as name, telephone number, or the like, needs to be communicated between the sales assistant and the customer. Furthermore, no extra equipment, such as a scanner for scanning in a telephone ID, or the like, is necessary, thereby providing a simple, efficient and reliable way of identifying the correct customer device.

The identifier may be presented to the customer via a display of the customer device, or by another suitable output device, e.g. audible.

The identifier may be directly entered into the transaction system by the customer, e.g. via a keyboard, a keypad, or by selecting a number from a list of numbers which may be displayed on a display of the transaction system. In another embodiment, the identifier may be transmitted from the customer device to the POS, e.g. via infrared or radio-based transmission. In a scenario with a shop assistant operating a POS system, the identifier may be communicated to the shop assistant and then be entered by the shop assistant. For example, the shop assistant may simply ask the customer for his identifier.

In a preferred example embodiment, the first identifier is a sequence of alphanumeric characters comprising digits and/or letters. Preferably, the sequence comprises less than five alphanumeric characters. In many applications, even two digits or characters may be sufficient. Consequently, the identifier may be easily communicated and/or entered, and the likelihood of errors due to misunderstandings and/or the entering of incorrect identifiers is reduced.

In a further preferred example embodiment, the first identifier has a length determined by the transaction system on the basis of the number of customer devices having established a wireless communications link with the transaction system. Consequently the length of the identifier may be optimised depending on the number of customers currently in line, thereby ensuring a unique identification of customer devices with the shortest possible identifiers. For example, while in peak hours two or even three characters and/or digits may be needed, in off-peak hours a one-digit identifier may be sufficient to distinguish different customers.

In another preferred example embodiment, the method further comprises the steps of
  storing in a storage medium a set of customer data items in relation to a set of device data items, the set of customer data items being indicative of a set of registered customers and the set of device data items being indicative of a corresponding set of customer devices;
  presenting to a user of the transaction system selected ones of the set of customer data items related to the customer devices having established respective wireless communications links;
  receiving a second input by the transaction system from the user of the transaction system, the second input being indicative of a selected one of the presented customer data items.

Consequently, customer data, such as name, address, phone number, a password, a picture, or the like, may be stored by the transaction system together with an identification, e.g. a phone number, a Bluetooth device address, or the like, of one or more customer devices related to the customer. Hence, as the stored customer data is used to associate the customer who is ready to pay with a customer device, it is an advantage of this embodiment that no manual inputting of an identifier is necessary, thereby further reducing the likelihood of errors. Furthermore, as additional information, such as a picture, about the customer is used to identify the customer device, extra security may be achieved. For example, if the shop assistant selects the customer from a list of customers via a picture, the likelihood of an unauthorised person misusing the customer device is further reduced.

In a further preferred example embodiment, the step of presenting selected ones of the set of customer data items further comprises the step of selecting a subset of the number of customer devices based on additional information about the customer devices. This is particularly advantageous in situations with many cash registers in the vicinity of each other and/or a large number of customers being ready to pay for their goods. In such a situation, a large number of customer devices may have established communication links to the transaction system, thereby causing the list of customer data items presented to the cashier to be rather long. Hence, a limitation to relevant customer data items makes it easier for the shop assistant to select the right customer, thereby increasing the efficiency of the method. Such a limitation may, for example, comprise a limitation to customer devices within a certain distance from the cash register. Correspondingly, the additional information may comprise reception characteristics of at least the established wireless communications links, e.g. by measuring or estimating the distance of the customer devices from the POS.

In another further preferred example embodiment, the step of presenting selected ones of the set of customer data items further comprises the step of presenting the selected customer data items in a predetermined order based on additional information about at least one of the customer data and the customer devices. Consequently, the presented list of customer data items may be ordered such that the most likely customers are on top of said list. Again, this provides a particularly efficient way of identifying the correct customer device, especially in situations with a large number of customers.

The additional information may comprise reception characteristics of at least the established wireless communications links, e.g. by measuring or estimating the distance of the customer devices from the POS and presenting the closest devices on top of a list. Alternatively, other types of information may be used, e.g. the type of goods purchased in relation to previously purchased items. If, for example, a customer has purchased diapers and baby food and if historic information about the purchase preferences of customers is stored in the transaction system, a family father may be placed higher on the list than somebody who usually does not purchase diapers, etc.

In yet another preferred example embodiment, the transaction includes a transfer of a predetermined amount from a customer account to a recipient account, and the method further comprises the steps of

- transmitting a second data signal indicative of the predetermined amount from the transaction system to the first customer device via the corresponding wireless communications link;
- receiving a third input from the selected customer to the wireless customer device, the third input being indicative of an authorisation to transfer the predetermined amount from the customer account to the recipient account;
- transmitting the first data signal in response to the third input; and
- initiating the transfer of the predetermined amount by the transaction system in response to the received first data signal.

It provides a secure and efficient method of initiating a transaction. As the customer is required to authorise the transaction using his customer device after the customer device has been associated with him, the likelihood of erroneous transactions or misuse is further reduced.

In yet another preferred example embodiment, at least a first one of the respective wireless communications links is a Bluetooth link. Bluetooth is a short-range RF based communications technology operating at 2.4 GHz and with a range of currently up to approx. 10 m. However, future versions of Bluetooth are expected to operate at larger distances, e.g. 100 m. Furthermore, it is an advantage that Bluetooth is not direction sensitive and that it provides the possibility of creating ad-hoc connections between Bluetooth devices without the need of user interaction. Consequently, wireless communications links may be established automatically or in response to a user action, while the customer is waiting in line, even in a certain distance from the POS.

A system for processing a transaction request, includes a transaction component and a number of customer devices carried by respective customers. A transaction request is approved by transmitting a first data signal from a customer device to the transaction component via a wireless communications link.

The system further includes:

- communications means for establishing respective wireless communications links between the transaction component and corresponding ones of the number of customer devices; and
- means for identifying a first one of the number of customer devices having established respective wireless communications links as being a customer device carried by a selected one of the customers.

In a preferred example embodiment,

- the means for identifying a first one of the number of customer devices comprise first processing means adapted to assign respective identifiers to each of the number of customer devices, a first identifier corresponding to the first customer device;
- the communications means is adapted to transmit the respective identifiers from the transaction component to corresponding customer devices via the corresponding wireless communications links; and
- the means for identifying a first one of the number of customer devices comprises means for using the identifier to associate the selected customer with the first customer device.

In a further preferred example embodiment, the means for using the identifier to associate the selected customer with the first customer device comprises

- first output means for presenting the first identifier to the selected customer; and
- first input means for receiving a first input from a user of the transaction component, the first input being indicative of the first identifier.

In another preferred example embodiment, the system further comprises

- a storage medium adapted to store a set of customer data items in relation to a set of device data items, the set of customer data items being indicative of a set of registered customers and the set of device data items being indicative of a corresponding set of customer devices;
- second output means for presenting selected ones of the set of customer data items to a user of the transaction component; and
- second input means for receiving a second input from the user, the second input being indicative of a selected one of the presented customer data items.

In yet another preferred example embodiment,

- the transaction request includes a request to transfer a predetermined amount from a customer account to a recipient account;
- the communication means is adapted to transmit a second data signal indicative of the predetermined amount from the transaction component to the first customer device via the corresponding wireless communications link;
- the first customer device comprises third input means for receiving a third input from the selected customer, the third input being indicative of an authorisation to transfer the predetermined amount from the customer account to the recipient account;
- the communication means is further adapted to transmit the first data signal in response to the third input; and
- the system further comprises second processing means adapted to initiate the transfer of the predetermined amount by the transaction component in response to the received first data signal.

The technology further relates to a customer device for processing a transaction request from a transaction system, a transaction request being approved by transmitting a first data signal from the customer device to the transaction system via a wireless communications link; the customer device comprising communications means for establishing a wireless communications link between the customer device and the transaction system; and means for assisting the transaction system in identifying the customer device among a number of customer devices having established respective wireless communications links as being a customer device carried by a selected customers.

The technology further relates to a transaction system for processing a transaction request to be approved by a first customer device by transmitting a first data signal from the first customer device to the transaction system via a wireless communications link; the transaction system comprising communications means for establishing respective wireless communications links between the transaction system and a number of customer devices; and means for identifying the first customer device among the number of customer devices having established respective wireless communications links as being a customer device carried by a selected customer.

The technology further relates to a computer program comprising program code means for performing all the steps of the method described above and in the following when said program is run on a computer. Preferably, the computer program is embodied on a computer-readable medium.

The term input means may comprise a keyboard, a keypad, a button and or an arrangement of buttons, a touch screen, a pointing device, such as a mouse, a trackball, a touch pad, a digital pen, or the like the term input means may further comprise other forms of man-machine interfaces, such as a voice interface, or the like.

The processing means may comprise a microprocessor, an application-specific integrated circuit, or another integrated circuit, a smart card, a general purpose computer adapted by suitable software, or the like.

The term output means may comprise a display device, such as a monitor, a liquid crystal display, a cathode ray tube to display a graphical user interface, or the like. Alternatively or additionally, the output means may comprise an audible output device, such as a sound card and/or a speaker.

The term storage medium may comprise any computer-readable medium, such as magnetic tape, optical disc, digital video disk (DVD), compact disc (CD or CD-ROM), mini-disc, hard disk, floppy disk, ferro-electric memory, electrically erasable programmable read only memory (EEPROM), flash memory, EPROM, read only memory (ROM), static random access memory (SRAM), dynamic random access memory (DRAM), synchronous dynamic random access memory (SDRAM), ferromagnetic memory, optical storage, charge coupled devices, smart cards, etc.

The term communications means comprises a transmitter and/or a receiver adapted to establish and transmit/receive data via the wireless communications links.

DETAILED DESCRIPTION

Figure 1A:
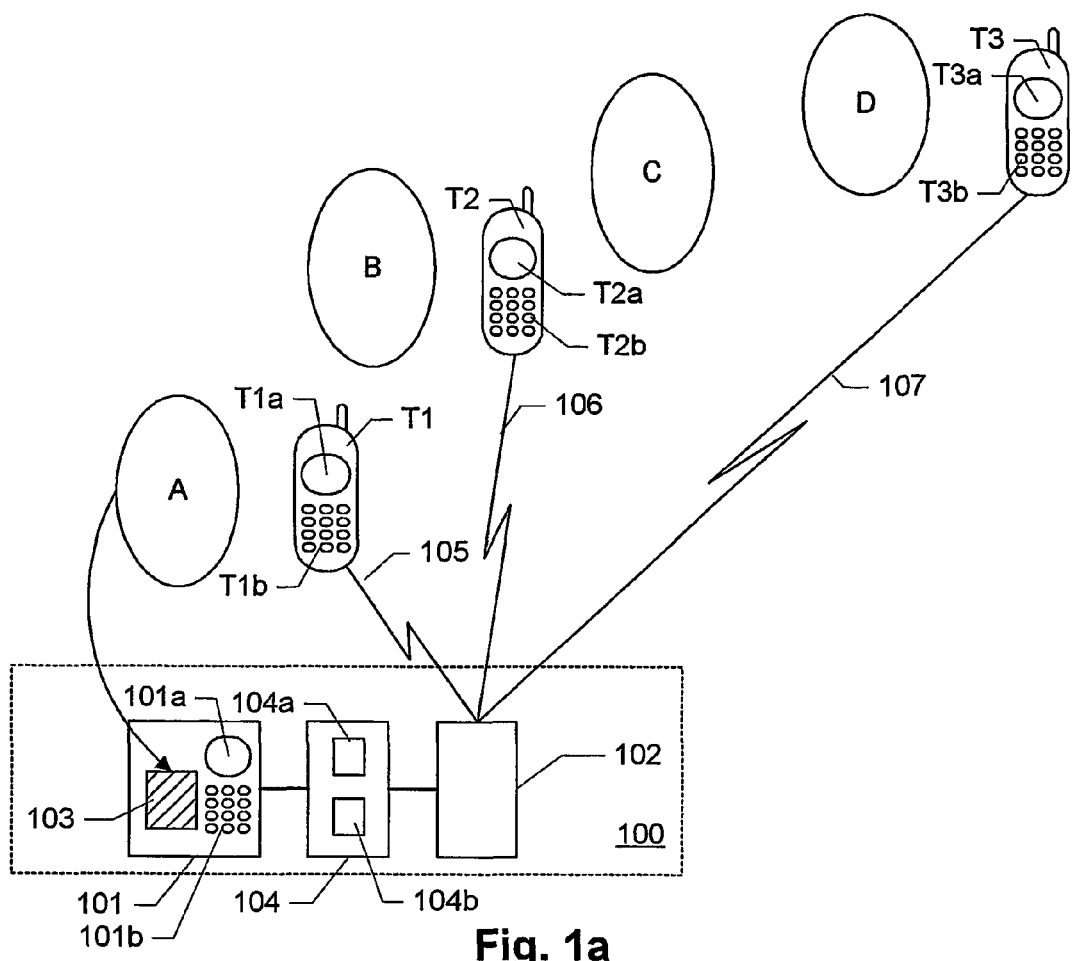
FIG. 1a shows a schematic view of a first example embodiment of a system.

FIG. 1a shows a schematic view of a first embodiment of a system. The transaction system 100 comprises a point of sale (POS) system 101 with a display 101a and a keyboard/keypad 101b. For example, the POS may comprise a cash register with a scanning station for the scanning of barcodes on the goods, or other means for registering the goods, e.g. a keyboard, keypad or other input means for manually inputting prices and/or product IDs, means for registering product information stored on a microchip, etc. The POS system 101 is connected to a server computer 104 with a central processing unit (CPU) 104a and a storage medium 104b. The server computer 104 manages the transactions and it is further connected to a Bluetooth transceiver 102. Preferably, the Bluetooth transceiver 102 operates in an inquiry mode. In this mode the transceiver constantly or periodically attempts to discover and identify customer devices within its range in order to establish Bluetooth connections to the customer devices T1-T3 carried by customers in the proximity of the transceiver 102. In the example of FIG. 1a the customers A-D are in the proximity of the POS system 101, and customers A,B, and D carry PTDs T1, T2 and T3, respectively. The PTDs T1-T3 each comprise a display T1a T3a, a keypad T1b T3b, and a Bluetooth transceiver (not shown), and they are adapted to establish respective Bluetooth connections 105-107 to the transceiver 102. The customer devices may be in a discoverable mode and ready to establish a Bluetooth connection to the transceiver 102. In another embodiment, the customer device may not permanently be ready to accept the establishment of a Bluetooth connection but rather require an input from the customer in order to initiate the attempt to establish a connection. For example, the customer may press a button on the customer device or select a corresponding menu item. In the example of FIG. 1a, it is customer A's turn to pay, and he has placed an item 103 on a counter at the POS system 101. Furthermore, in the example of FIG. 1a, customer A carries a PTD T1 which has established a Bluetooth link to the transceiver 102.

Figure 1B:
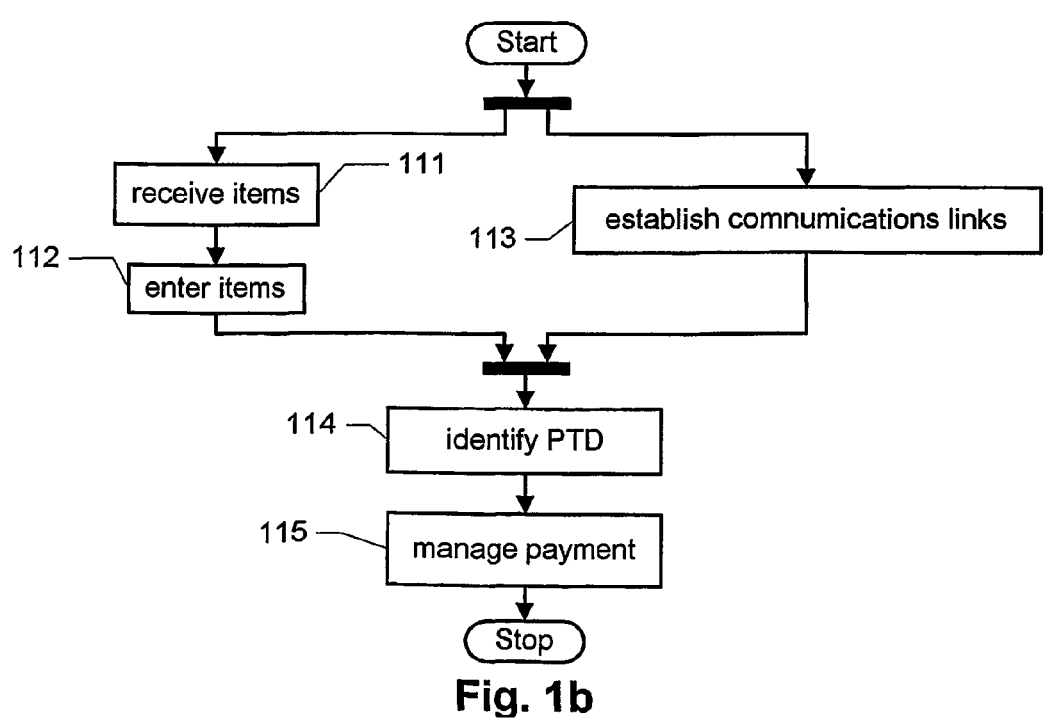
FIG. 1b shows a flow diagram of a method according to an example embodiment.

FIG. 1b shows a flow diagram of a method according to an example embodiment. The flow diagram in FIG. 1b refers to the system illustrated in FIG. 1a. When a customer A approaches the check-out counter of the POS system 101, he places, in step 111, the item 103 he wishes to purchase on a counter and, in step 112, the price of the item is entered into the POS system 101. For example, this may be done by a shop assistant, e.g. manually or by scanning a bar code placed on the item. In step 113 the transceiver 102 has established communications links to the customer devices T1-T3 which are currently in the proximity of the transceiver 102. Preferably, this is done asynchronously to and independently of the step 112 of entering the price of the item 103, such that the server computer 104 at any time maintains a list of PTDs which are currently connected to the transceiver 102. When the customer A wishes to pay for the item 103 with his PTD, in step 114, the shop assistant identifies customer A's PTD T1 from the list of PTDs which are currently connected to the POS system 101. Once the correct PTD is identified, the payment may be handled in step 115 by the server computer 104 and the PTD T1.

During a traditional credit card payment in a retail store, the customer slides his or her card through the card reader associated with a cash register. Besides transferring the customer's credit card information to the card reader, this also serves to uniquely associate the customer with the amount to be paid. For a brief moment the customer is actually in physical contact with the POS, as he is holding his card, the card is touching the card reader, and the card reader is connected to a specific POS. Assuming that there is only a single card reader per POS and that only a single card fits into the card reader at a time, the result is unique association.

When a PTD is used instead of a credit card, the conditions which guarantee unique association are violated, since there is no physical contact between the customer and the POS, and since several customers with PTDs may be connected to the same POS simultaneously. As a result, situations may arise where it is unclear which customer is paying for what. As described above, this problem is solved according to the invention.

Figure 2:
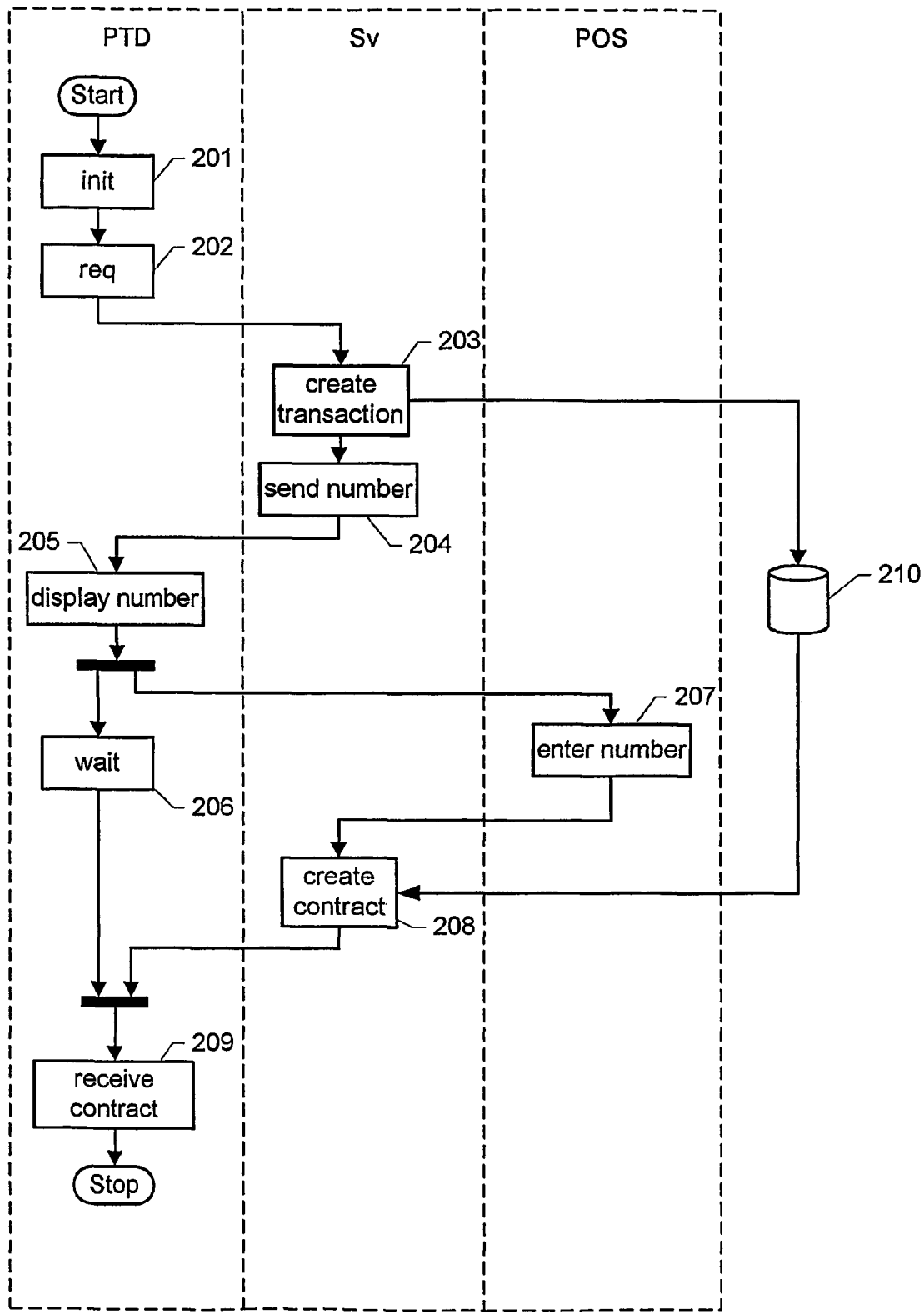
FIG. 2 shows a flow diagram of a first example embodiment of the step of identifying the customer device of the customer whose turn it is to pay.

FIG. 2 illustrates a flow diagram of a first embodiment of the step of identifying the customer device of the customer whose turn it is to pay. The flow diagram in FIG. 2 is arranged in three columns labelled PTD, Sv and POS, thereby indicating which steps are performed by the PTD T1, the server computer 104, and the POS system 101, respectively. Initially, in step 201, the customer A initiates the identification and payment process, e.g. by pressing a button on his PTD. In the subsequent step 202, the PTD sends a corresponding request to the server computer. In response to this request, in step 203, the server creates a data record in a database 210 corresponding to a new transaction. The server computer further generates a number or another identifier and associates it to the new transaction. The number may for example be a two-digit number, selected such that at any time there is only one open transaction stored in the database 210 with that number associated to it. In the subsequent step 204, the generated number is sent to the PTD where it is displayed (step 205). The above steps 201-205 may be performed while the customer is still waiting in line before it actually is his turn to pay. After displaying the number, the PTD waits (step 206) for the server computer to transmit an electronic contract. Hence, several PTDs may be waiting at the same time, since several customers waiting in line may have initiated the payment process and may have received respective numbers. For each of these PTDs there is a data record representing an open transaction in the database 210. When it is the customer A's turn to pay and his goods are registered in the POS system, he indicates to the shop assistant that he wishes to pay with his PTD and communicates the number displayed on his display to the shop assistant. In step 207, the shop assistant enters the number in the POS system, and the POS system communicates the number to the server computer. In the subsequent step 208, based on the received number, the server computer retrieves the corresponding transaction information from the database 210, including the identification of the PTD T1 and the corresponding communications link. Furthermore, the server computer generates a contract including the total price of the registered items and sends the electronic contract to the PTD T1, which receives the contract in step 209. Subsequently, an electronic transaction may be initiated between the identified PTD T1 and the server computer based upon the electronic contract. This will be described in greater detail in connection with FIGS. 3, 6 and 7a-d.

It is understood that other ways of presenting the number to the customer may be employed, e.g. an audible presentation via the speaker of the phone.

It is further understood that other ways of entering the number into the POS system may be utilised. For example, the customer may enter the number directly into an automated POS system without interacting with a sales assistant, e.g. via a keypad, touch screen, speech recognition, or the like.

Alternatively, a shop assistant selects a number from a list of numbers, e.g. by pointing with a pointing device on a list of items displayed on a display, or by keying in the number via a keypad.

Figure 3:
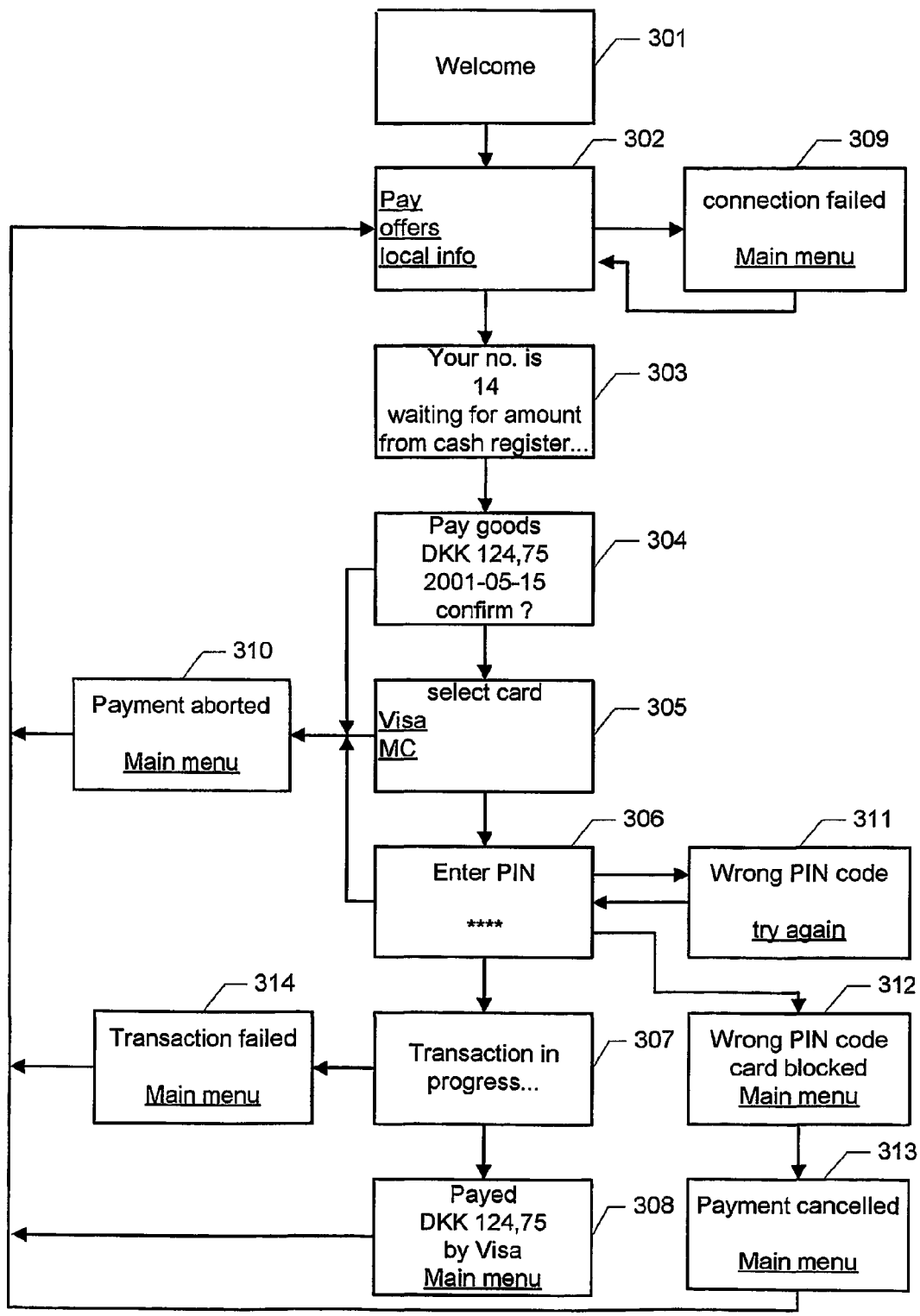
FIG. 3 schematically illustrates a number of screen pictures displayed on the display of the customer device during the process of paying for items with a customer device.

FIG. 3 schematically illustrates a number of screen pictures displayed on the display of the customer device during the process of paying for items with a customer device according to the invention. When a communications link between the vending system and the PTD is established, a welcome screen 301 may be displayed on the PTD, e.g. comprising a welcome message, a logo and/or the like. The welcome screen may also trigger an audible message, e.g. a beep sound, in order to catch the customer's attention. Subsequently, e.g. after a predetermined period of time, the welcome screen is replaced by a main menu 302, which may comprise a list of selectable items, e.g. as WAP links or the like. The list may comprise a "pay" item which may be selected when the customer wishes to use the PTD for paying. Other items may comprise information about special offers or other local information about the store. If the customer selects the "pay" item, e.g. by using the navigation keys of the keypad of the PTD, a request is sent to the vending system as described in connection with FIG. 2. In response to that request, the PTD receives a number which is displayed on screen 303. If the communication fails, an error message 309 may be displayed allowing the customer to return to the main menu via a corresponding link. When the PTD has received an electronic contract from the vending system, e.g. according to step 209 in FIG. 2, a screen picture 304 with the total amount is displayed asking the customer to confirm the payment. If the customer confirms, e.g. by pressing a "YES" button on the PTD, a screen 305 may be displayed, allowing the customer to select one of a number of alternative credit cards. When the customer has selected a card, a screen 306 is displayed asking the customer to enter a corresponding PIN code. If the customer does not have several cards to choose from, the screen 306 may be displayed directly after screen 304. Furthermore, in connection with the above screens 304-306, the customer has the possibility to cancel the payment, e.g. by pressing a "NO" or "CANCEL" button of the PTD. In this case a screen 310 is displayed which informs the customer that the transaction has been cancelled and which allows him to return to the main menu 302. After entering the PIN code via the keypad of the PTD in connection with screen 306, the PIN code is verified. If the PIN code was incorrect, the customer is informed about the error by displaying a corresponding message 311, and he may return to the screen 306 to try again. If he failed a predetermined number of times, e.g. 4 times, the card may be blocked and payment cancelled. The customer may be informed about this, e.g. by the screen 312-313 allowing him to return to the main menu 302. If the PIN code was correctly verified, the transaction is initiated. While the actual transaction is in progress a corresponding message 307 may be displayed. The steps performed during the actual transaction will be described in connection with FIGS. 7a-d. After successful completion of the transaction, a corresponding acknowledgement 308 is displayed and the customer may return to the main menu 302. If the transaction has failed for some reason, e.g. due to a communications error, or the vending system being down, a corresponding error message 314 is displayed instead.

Figure 4:
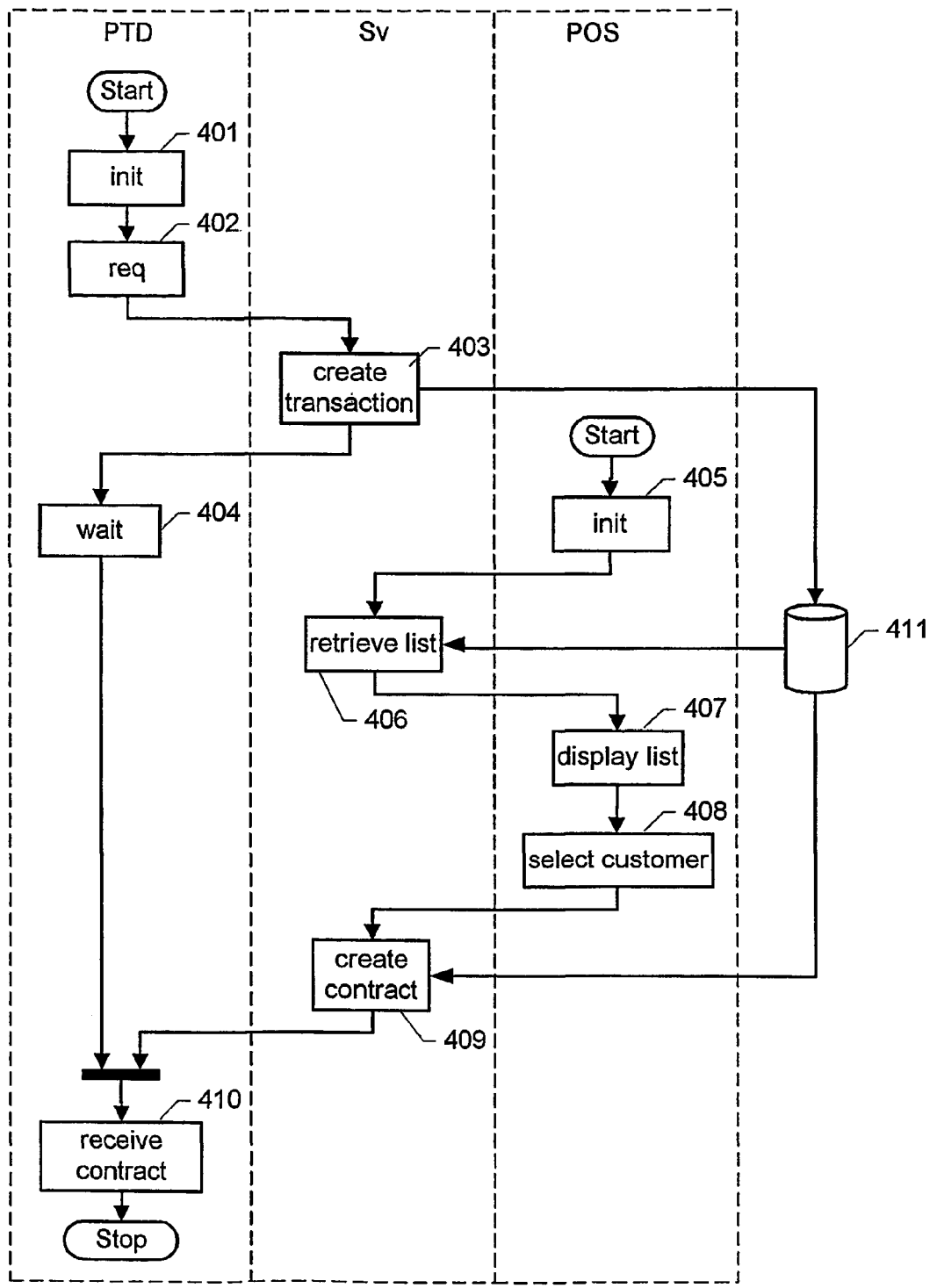
FIG. 4 illustrates a flow diagram of a second example embodiment of the step of identifying the customer device of the customer whose turn it is to pay.

FIG. 4 illustrates a flow diagram of a second embodiment of the step of identifying the PTD of the customer whose turn it is to pay. Again, the flow diagram in FIG. 4 is arranged in three columns labelled PTD, Sv and POS, indicating which steps are performed by the PTD T1, the server computer 104, and the POS system 101, respectively. As in the embodiment described in connection with FIG. 2, the customer A initiates the identification and payment process in step 401, e.g. by pressing a button on his PTD. In the subsequent step 402, the PTD sends a corresponding request to the server computer. In response to this request, in step 403, the server creates a data record in a database 411 corresponding to a new transaction, and sends a reply to the PTD, causing the PTD to wait, in step 404, for the server computer to transmit an electronic contract. In contrast to the embodiment of FIG. 2, no number is transmitted for display on the display of the PTD. Again, the above steps 401-404 may be performed while the customer is still waiting in line before it actually is his turn to pay.

When the shop assistant at the POS system has registered the items of customer A and customer A has indicated that he wishes to pay via his PTD, the shop assistant initiates (step 405) the payment process at the POS system, e.g. by selecting a "pay by PTD" option on a menu displayed in the user interface of the POS system, by pressing an appropriate button, or the like. The POS system sends a corresponding request to the server computer which, in step 406, retrieves a list of currently open transactions from the database 411. The data record corresponding to each transaction comprises a unique ID of the corresponding PTD. For example, the ID may be received from the PTD during the establishment of the communications link. According to this embodiment of the invention, the database further comprises information about registered customers, such as the customer's name, picture or other relevant information together with the IDs of one or more PTDs owned by the customer. This information may be acquired and stored in connection with an initial registration of the customer. Hence, the list of transactions retrieved in step 406 comprises a list of customers who are currently ready to pay using their PTD. In the subsequent step 407 the retrieved list is presented to the shop assistant via the display of the POS system, and the shop assistant may use the list to identify the customer in front of him (step 408). For example, if the list contains a name, the cashier may simply ask the customer for his name, receive the answer and make the appropriate selection, e.g. via a pointing device, a touch screen or a keyboard/keypad of the POS system. If the list contains pictures, the cashier may make a selection by looking at the customer, comparing the customer with the pictures on the list and selecting the appropriate picture. Based on the shop assistant's selection, the server computer retrieves the corresponding transaction information and generates a corresponding electronic contract in step 409. The electronic contract is subsequently transmitted to and received by the waiting PTD in step 410. Subsequently, an electronic transaction may be initiated between the identified PTD and the server computer based upon the electronic contract. This will be described in greater detail in connection with FIGS. 3, 6 and 7a-d.

Alternatively or additionally, if no customer is registered for a PTD or no customer information is available at the transaction system, a number may be sent to that PTD as in the embodiment of FIG. 2.

It is noted that the list of transactions which is presented to the cashier may be limited to records corresponding to clients which are in a predetermined area. For example, this may be achieved by shielding of the communications signals or additional measurements, e.g. by using multiple radio transceivers, GPS measurements, etc. Alternatively or additionally, the list may be prioritised, e.g. by comparing the registered items with the typical types of goods purchased by the customers during previous visits. Preferably, the list is only be presented, if multiple customers are accessing the payment system and a selection is necessary.

Figure 5:
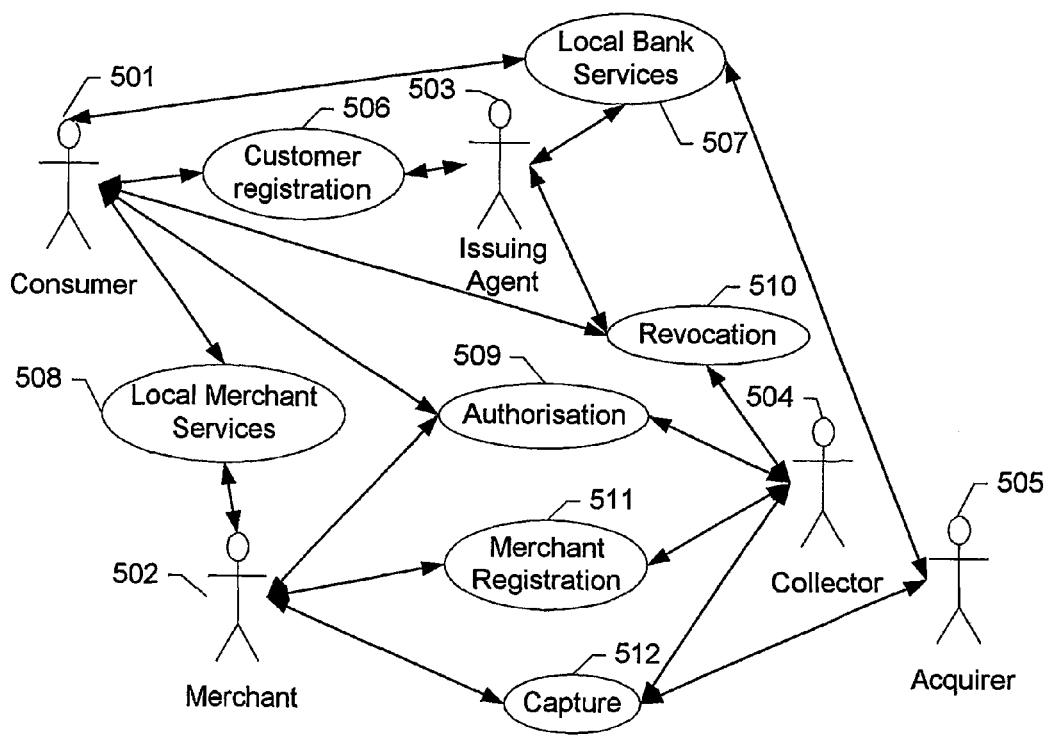
FIG. 5 shows the different actors and processes related to a system.

FIG. 5 illustrates the different actors and processes related to a system according to an example embodiment FIG. 5 also illustrates by arrows which actors are involved in which processes or use cases. The actors include the customer 501, i.e. the person shopping and paying using a customer device according to the invention, the issuing agent 503, i.e. the agent issuing the electronic credit cards, e.g. via the bank of the customer 501, the merchant 502, i.e. the company offering a payment service according to the invention, the acquirer 505, i.e. the bank of the merchant 502, and the collector 504, i.e. a company acting as intermediate between merchants and acquirers.

The different use cases related to a system according to an embodiment of the invention comprise:

Customer Registration 506: The primary job of the issuing agent 503 is to provide customers 501 with electronic credit cards embodied as electronic certificates. This is referred to as customer registration. Preferably, the customer 501, the merchant 502, and the collector 504 have a number of keys and certificates. For example, all parties may have been issued or have generated two key pairs, an authentication key pair and a signature key pair, e.g. according to a standard encryption algorithm such as the RSA encryption and authentication system. The authentication key pair is used to establish encrypted connections between the three parties. The signature key pair is used to digitally sign transactions in order to achieve non-repudiation. Furthermore, each party may have been issued certificates authenticating their public authentication and signature keys. The authentication certificates may be exchanged between the protocol stacks of two parties when a secure connection is established. The signature certificates enable the parties to perform specific actions: The customer's signature certificate represents an electronic credit card. It enables the customer to digitally sign payment contracts issued by the merchant. The merchant and collector may verify the authenticity of the public signature certificate to guard against fraud. The merchant's signature certificate indicates that the merchant has been authorised to receive payment from a PTD. The merchant system uses this certificate to sign requests made to the collector, thereby enabling the collector to verify the merchant's identity and privileges. The collector's certificate is used by the merchant to verify authorisation and capture response messages. This enables the collector to produce legally binding replies to the merchant. Preferably, in addition to the certificates mentioned above, the parties are issued two trusted root certificates: The Root Authentication (RA) and Root Signature (RS) certificates. The RA certificate is a self-signed certificate containing the public key of the certificate authority, which issued the other authentication certificates. The RA certificate is used to verify the authenticity of the other authentication certificates.

The RS certificate is a self-signed certificate containing the public key of the certificate authority, which issued the other signature certificates. The RS certificate is used to verify the authenticity of the other signature certificates. The collector verifies the validity of both customer and merchant certificates, including revocation checking. Hence, the merchant does not need to perform revocation checks of customer certificates. If one assumes that collector certificates are not revoked, the merchant system does not need to perform any revocation checks. In this case, revocation lists are not distributed, but simply maintained by the collector. The PTD does not receive signed content, hence it has no need for an RS certificate. During customer registration, the issuing agent 503 verifies that the customer's public signature key corresponds to the customer's private signature key and that the customer is who he or she claims to be. Based on this, the issuing agent creates a certificate containing the public key, customer ID, and account information. The certificate is issued to the customer, who stores it in the PTD, e.g. as an URL.

Revocation 510: Because PTDs may be stolen or misused, the issuing agent 503 has the option to revoke customer certificates. Similar considerations apply for merchant certificates as described below. Revocation is performed by informing the collector 504 that a certain certificate is no longer valid. The revocation of customer certificates may be done on behalf of the customer 501.

Merchant Registration 511: The purpose of merchant registration is to enable merchants 502 to receive electronic payments according to the invention. For this purpose, the collector 504 issues a merchant certificate containing the merchant's public signature key and the merchant ID.

Authorisation 509: During payment transactions, the merchant 502 requests payment authorisation from the collector 504. If authorisation is granted, the merchant 502 receives a guarantee that money can be transferred from the customer 501 to the merchant 502.

Capture 512: The collector 504 acts as a front-end to a financial network of participating banks. As such, the primary function of the collector 504 is to resolve the security based on a public key infrastructure (PKI) before forwarding transactions to the acquirer 505. In line with existing credit card processing procedures, the collector 504 "collects" transactions from the merchant (during authorisation) into batch jobs, which are exchanged with the acquirer 505 on a regular basis. The exchange of batch jobs is referred to as "capture". Preferably, the merchant 502 initiates capture processing at the end of the business day. It should be noted that no money is moved between accounts before the capture phase.

Local Merchant Services 508: Preferably, the customer 501 has access to various localised services, e.g. WAP services, provided by the merchant 502,. Examples of such services include special offers, e.g. advertisements, directions, e.g. to the physical placement of certain goods, and information on goods and services.

Local Bank Services 507: Preferably, the customer 501 has access to various services, e.g. WAP services, provided by the acquirer 505 or issuing agent 503. Examples of such services include information about special offers, e.g. advertisements to cardholders, exchange rates, balance information of the customer's accounts, and information about other services.

It should be noted that the above actors and use cases are examples, and a system may correspond to other actors and/or use cases within the scope of the invention.

Figure 6:
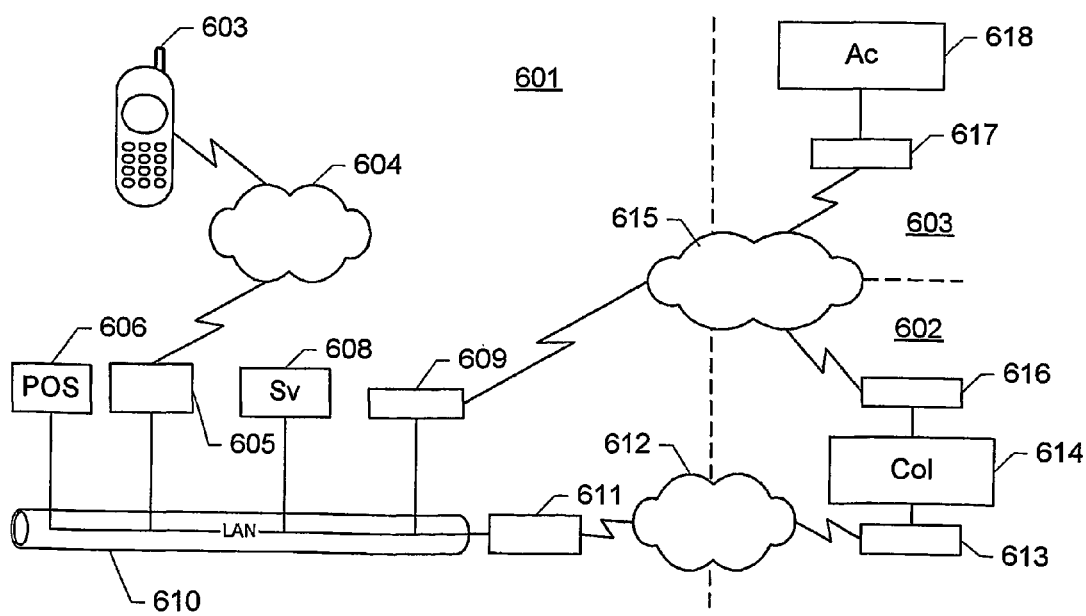
FIG. 6 shows a schematic view of a system according to a preferred example embodiment.

FIG. 6 shows a schematic view of a system according to a preferred example embodiment. The system is distributed across three sites: The merchant site 601, e.g. a retail store, the collector site 602, and the acquirer site 603. At the merchant site 601, one or more POS systems 601 are logically associated with a Bluetooth network access point 605. A network access point comprises a Bluetooth transceiver and provides access to the local area network (LAN) 610 via the wireless Bluetooth network 604. When a customer approaches the POS system 606, a Bluetooth connection is established, via the wireless Bluetooth network 604, between the customer's PTD 603 and the network access point 605. via the LAN 610, the network access point is connected with an application server 608 running a payment application software. Hence, the customer gains access to the payment application via the Bluetooth connection and the network access point 605. The application server 608 is also connected to the POS system 606 via the LAN 610. The payment application running on the server 608 receives the amount to be paid from the POS system 606 via the LAN, and presents this amount to the customer via the PTD 603. The customer digitally signs an agreement to pay this amount, and this signature is returned to the payment application on the server 608. The application, in turn, requests payment authorisation from the collector system 614. The application server is connected to the collector system 614, via a communications system, e.g. via ISDN routers 611 and a telephone network 612 or through a firewall 609 via the Internet 615. Preferably, the ISDN routers act as firewalls in the former case. The choice of connection may depend upon the merchant's existing equipment. The collector system 614 is further connected to the acquirer system 618, preferably via the Internet 615. Preferably, both the collector system 614 and the acquirer system 618 are protected by firewalls 616 and 617, respectively. Preferably, WTLS is used between the PTD and the merchant system, whereas SSL is used between the merchant and collector systems.

FIGS. 7*a-d* show schematic views of message flows between the components of a system according to an embodiment of the invention, e.g. the messages communicated during the processing of a transaction between the POS system 606, the server computer 608, the collector system 614, and the customer device 603 shown in FIG. 6. A transaction is represented by a data record in a database maintained by the payment application on the server computer. A transaction may go through a number of states during its lifecycle, including the following states:

Open: The customer has chosen to pay using the PTD. Multiple customers may be queued in the system, waiting to pay.

Active: The transaction has been tied to a purchase and the total amount to be paid is known. Preferably, only one transaction can be active per POS.

Offered: The customer has been issued a payment contract to sign. Preferably, only one transaction may be offered per POS.

Signed: The customer has signed the payment contract and it has been forwarded to the collector. Preferably, only one transaction may be signed per POS.

Authorised: The collector has authorised the payment. Preferably, only one transaction may be authorised per POS.

Completed: The POS system has written a paper receipt to the customer.

In addition to the above states, the transaction may enter additional states, e.g. error states.

In FIGS. 7*a-d*, vertical lines correspond to the different components of the system and illustrate a logical flow from top to bottom. Arrows between columns indicate messages communicated between the corresponding components, where solid arrows correspond to messages, dashed arrows correspond to replies to messages. Dotted arrows correspond to updates and/or queries of the database 704 where the transactions are stored together with their respective status and identified by respective transaction IDs. The vertical lines further comprise boxes illustrating processes being performed by the corresponding components. Arrows starting and ending at the same column correspond to control flows within the same process, such as loops.

Figure 7A:
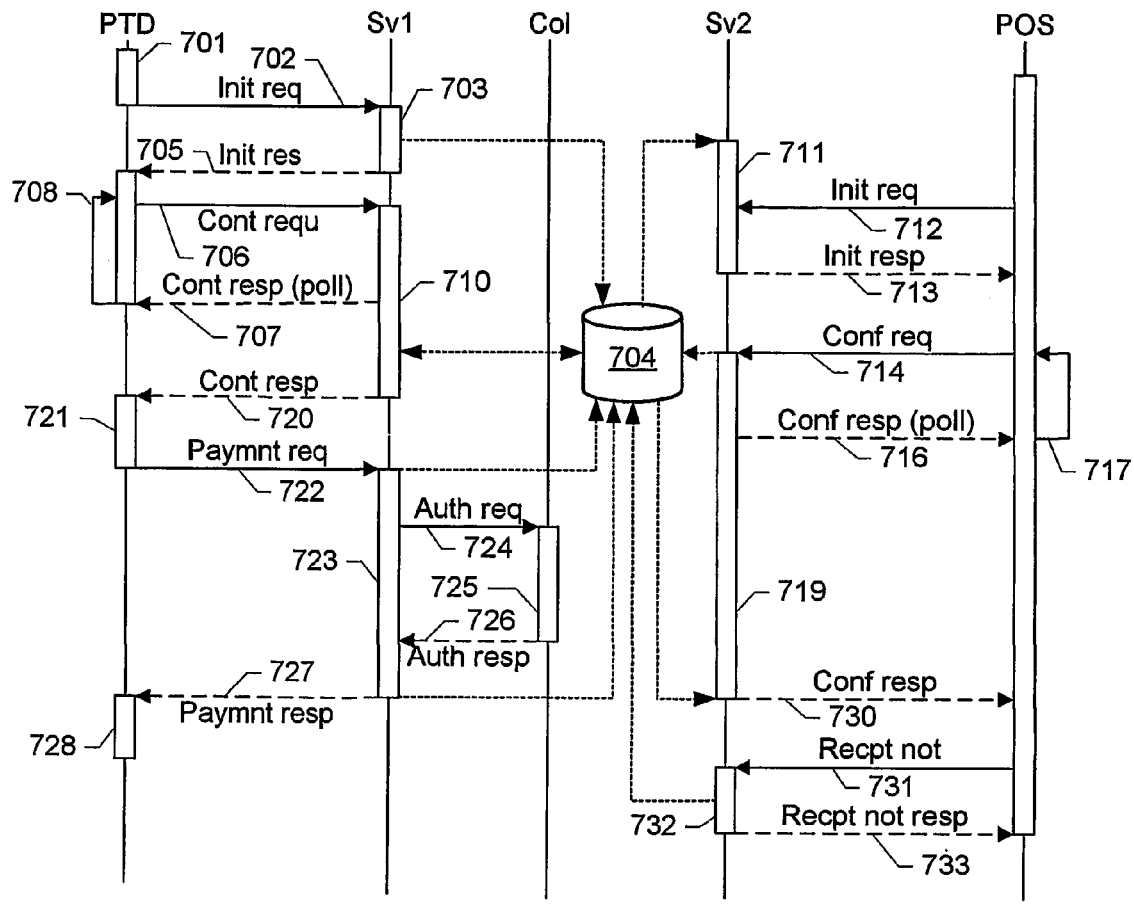
FIG. 7a-d illustrate messages communicated between the components of a system according to an example embodiment.

In FIG. 7a the columns labelled PTD, Col, and POS correspond to the customer device, the collector system and the POS, respectively. The server computer of the vending system is represented by two columns labelled Sv1 and Sv2, corresponding to two server processes of the payment application running on the server computer which are responsible for the communication with the PTD and the POS system, respectively. The two server processes will also be referred to as PTD servlet SV1 and POS servlet Sv2, respectively, as they may be implemented as Java servlets. The two server processes may communicate via updates of the database 704 hosted by the server computer. Alternatively, the database 704 may be physically located on a different computer, and/or the two processes may be executed on separate computers or they may be implemented by a single process.

In the example of FIG. 7a, a customer has picked out a number of goods and has reached the POS system. The goods have been registered by the cashier in the POS system, and the total amount to be paid is known. Furthermore, a Bluetooth link has been established between the PTD and the network access point, e.g. using standard Bluetooth mechanisms. When the customer selects "Pay" on his PTD (step 701), the PTD sends a payment initialisation request 702 to the PTD servlet Sv1. For example, the request 702 may be a WSP GET request, e.g. "http://someserver/servlets/PTDServlet", where the PTD provides no query part in the request URL. This indicates that a new transaction is requested. In step 703, the servlet Sv1 creates a new, open payment transaction in the database. Preferably, the transaction is related to a transaction ID which, for example, may comprise a 14-digit integer containing a 4-digit year, a 2-digit month, a 2-digit day, and a 6-digit serial number. An example of such an ID is "2001012123456." The ID of the open transaction is returned to the PTD as part of a response message 705, causing the PTD to enter a polling loop 708. In this loop, the PTD queries the application at regular intervals for a contract, e.g. every second, as indicated by the request 706 and the response 707. For example, the request 706 may be a WSP GET request comprising the transaction ID in the query part of the URL. Following the example of the above transaction ID, an example of such an URL may be "http://someserver/servlets/PTDServlet?id=20001012123456." While in the polling loop 708, a message may be displayed on the PTD telling the customer to wait. If the payment set-up requires the customer to verbally identify himself to the cashier, a number may be displayed as part of the message, e.g. as illustrated by the message 303 in FIG. 3. This number may be transmitted as part of the response message 705, e.g. appended to the transaction ID.

Once the cashier initiates the payment process via the POS system, e.g. by pressing a "pay using phone" button on the POS system, a HTTP GET request 712, e.g. "http://someserver/servlets/CashRegisterServlet/trans" is sent to the POS servlet Sv2, causing the POS servlet Sv2 to look up the currently open transactions in the database 704 (step 711). Preferably, the POS system keeps polling the servlet Sv2 until there is a response. In one embodiment, the servlet Sv2 may return a list of open transaction Ids with associated customer descriptions and/or the displayed queue number.

The merchant system may use various techniques to limit the number of customers on the list, e.g. shielded Bluetooth coverage. The nature of the customer description depends on whether the merchant system has access to the customer's name or similar identifying information. Alternatively or additionally, the system may assign a queue number to the transaction and use this a description, as was described above. The list may be displayed to the cashier, who selects the right customer. Alternatively, in the case of the queue number, the cashier may enter the queue number. The POS system then enters a polling loop 717 where it asks for payment confirmation by sending a confirmation request 714 to the POS servlet Sv2 of the payment application. For example, the confirmation request 714 may comprise the transaction ID, a total amount and VAT, e.g. "http://someserver/servlets/CashRegisterServlet/trans?id=20001023123456&amount=149,99." While in this loop, the POS will query the servlet for payment confirmation at regular intervals (e.g. every second), as illustrated by the message-response pair 714 and 716 and the loop 717. The servlet Sv2 saves the received amount in the database 704 and updates the state of the transaction to "active" (step 719).

At the next poll of the polling loop 708 of the PTD, the PTD servlet Sv1 discovers the active state of the transaction in the database. Based on the amount, it issues a contract to the PTD (response message 720), records the contract and updates the state of the transaction to "offered" (step 710). For example, the contract response 720 may comprise the transaction ID followed by the contract text. Preferably, the contract text should be in plain text and it should follow a predetermined syntax to ensure that the collector system is able to parse it. An example of such a syntax is contract ::=<amount> NEWLINE <acceptor>
amount ::="Pay" NEWLINE <currency> SPACE <value>
currency ::=[AAA-ZZZ]
value ::=[0.00-99999999.99]
acceptor ::="to:"<name> NEWLINE <street> NEWLINE <city>
name ::=[A-Za-z0-9] [A-Za-z0-9]*
street ::=[A-Za-z0-9] [A-Za-z0-9]*
city :: =[A-Z][A-Za-z0-9]*.

An example contract following the above syntax is
"Pay
USD 20.00
to: Joe's *Grocery* Store
Someroad 20A
Sometown"

Preferably, the text is adapted to the customer's language and the format of the currency used by the merchant. Preferably, the text should be sufficiently short to be fully visible in the display of the PTD. When the contract is signed, the PTD may automatically include a UTC timestamp in the signature returned to the merchant. This makes the signature unique, assuming that the customer cannot sign more than one contract per second. Consequently, the collector can ensure that a signed contract can only be used once for authorisation. In step 721, the contract is displayed to the customer by the PTD, and the customer is requested to electronically sign it, e.g. by pressing a "YES" button. Once the contract is signed, the corresponding digital signature is returned to the PTD servlet Sv1 via a payment request 722. For example, the payment request 722 comprises a WSP GET request including the transaction ID and the customer's digital signature in the query part of the URL. The signature may further comprise an URL to the customer's certificate, e.g. in the format specified in WAP 1.2 signText( ) description including base64 encoded binary data using escape sequences for characters otherwise not allowed in an URL. Preferably, the customer certificate comprises the following fields:

Serial number: The serial number of the certificate assigned by the certification authority (CA).

Signature algorithm: Preferably a secure hash algorithm (SHA-1) with RSA encryption.

Issuer: Distinguished name of the CA as specified by the standard RFC2459 (X.509 certificate profile).

Subject: Distinguished name of the customer as specified by RFC2459 (X.509 certificate profile).

Subject Public Key Info: The customer's public RSA key.

Validity: Validity period of customer's certificate. Represented using UTC time.

Extensions: SubjectAltName: encrypted track 2 information, i.e. card number and expire date. KeyUsage: digitalSignature and nonRepudiation)

Preferably, the track 2 information is encrypted using the collector's public RSA key, ensuring that it can only be decrypted by the collector. Preferably, only the encrypted bytes are used, i.e. no encapsulation according to the cryptographic message syntax standard PKCS#7. Hence, an example of the payment request 722 may be "http://someserver/servlets/PTDServlet?id=20001012123456&signature=kFr4G78i45e46h8g5+4HFi4Ut78H5DDhGKj7bi66nswe." In step 723, the PTD servlet Sv1 stores the signature in the database 704, updates the state of the transaction to "signed", and forwards the transaction information to the collector Col as an authorisation request 724. For example, the authorisation request may be implemented using a secure (SSL v.3) HTTPS POST request. The request parameters are passed to the collector as a signed XML document in the request body. The signed document and the merchant's certificate are encoded according to PKCS#7. The document may comprise the following elements:

ID: The transaction's ID (equal to the ID in the signed contract), e.g. a 14 digit integer. The ID is made up of a 4-digit year, a 2-digit month, a 2-digit date, and a 6-digit serial number.

ACCEPTOR: Identification of the merchant extracted from merchant certificate, e.g. a 20-digit number constructed by concatenating the organisation and card acceptor id numbers.

VAT: The amount of VAT paid by the customer. The currency is the same as expressed in the contract, e.g. an integer expressing the amount in the smallest unit of the currency.

LOCALE: Indicates the locale of the contract, i.e. the language and number representation used to format the contract, e.g. "en-US" for English language and US as country.

CONTRACT: The contract signed by the customer, e.g. Base64-encoded data.

The "CONTRACT" element is constructed by the payment application, e.g. by the following steps:

The signed contents received from the PTD is decoded (e.g. base64 and ASN-1/DER) into a data structure as specified in the WAP 1.2 WML script cryptography library specification.

The contract text is inserted into the data structure.

The data structure is transformed from WAP standard to PKCS#7 layout and encoded according to PKCS#7.

The resulting binary data is base64 encoded.

In the above example, it is assumed that the merchant can be uniquely identified from the "ACCEPTOR" element and, combined with the transaction ID, the request can be uniquely identified. The collector compares the "ACCEPTOR" element with the contents of the corresponding certificate and verifies the identity of the merchant. The locale of the contract is used when parsing the contract text to extract the total amount and merchant identity. This allows the collector to handle contracts in multiple languages and with multiple number formats, e.g. comma instead of dot as decimal separator. An example of an authorisation request comprising the above fields is

```
"<!xml version=1.0/>
<MeTAuthorisationRequest>
<ID>20001012123456</ID>
<ACCEPTOR>74967396749673967385</ACCEPTOR>
<VAT>500</VAT>
<LOCALE>en-US</LOCALE>
<CONTRACT>
kFr4G78i45e46h8g5+4HFi4Ut78H5DDhGKj7bi66nswe</CONTRACT>
</MeTAuthorisationRequest>."
```

In step 725, the collector system Col processes the authorisation request and returns an authorisation response 726, e.g. as a signed XML document. For example, the document may be signed and encoded together with the collector's certificate in PKCS#7 format, and it may contain the following fields:

ID: Transaction ID

ACCEPTOR: Identification of merchant extracted from merchant certificate.

STATUS: Indicates whether authorisation was granted. Status values may comprise "authorised", "unknown merchant", "duplicate transaction", "merchant certificate invalid", "merchant certificate expired", "merchant certificate revoked", "customer certificate invalid", "customer certificate expired", "customer certificate revoked", "bad merchant signature", "bad customer signature", "invalid contract", "invalid date", "invalid amount", "system error".

CURRENCY: The currency of total and VAT.

TOTAL: The total amount authorised.

VAT: VAT of authorised amount.

Preferably, the authorisation response contains sufficient information to prove that a particular amount of money has been reserved for a particular acceptor. Even though the total amount and VAT amount may be inferred from the preceding communication, it is advantageous to have a single signed document containing all information. An example of such a document is

```
"<!xml version=1.0/>
    <MeTAuthorisationResponse>
        <ID>20001012123456</ID>
        <ACCEPTOR>74967396749673967385</ACCEPTOR>
        <STATUS>0</STATUS>
        <CURRENCY>USD</CURRENCY>
        <TOTAL>2000</TOTAL>
        <VAT>500</VAT>"
    </MeTAuthorisationResponse>."
```

Preferably, the merchant certificate and the collector certificate comprise fields corresponding to the fields described above in connection with the customer's certificate.

In response to the authorisation response 726, the PTD servlet Sv1 updates the state of the transaction to "authorised" and returns a payment response 727 to the PTD, causing the PTD to display a corresponding message to the customer. The payment response indicates whether authorisation was granted, and it may, for example, follow the following syntax:

```
response ::=<authorised> | <failed>
authorised ::="AUTH" SPACE <currency> SPACE <value>
currency ::=[AAA-ZZZ]
value ::=[0,00-99999999,99]
failed ::="FAIL" SPACE <reason>
reason     ::="COMFAILURE"    |    "INVALIDMERC"
   "INVALIDCARD" | "EXPIREDCARD" | "REVOKED-
   CARD."
```

If the payment was authorised, the response includes the authorised amount. The amount is displayed as part of the confirmation to the customer on the PTD. In addition to this electronic confirmation, the customer receives a paper receipt from the POS system. If the authorisation fails, the response includes the reason for the failure. Examples of reasons include:

COMFAILURE: The merchant system failed to communicate with the collector. Either the connection could not be established or there was an error in the format of the messages.

INVALIDMERC: The merchant system was not recognised by the collector. The merchant may not be registered or have an invalid, expired or revoked certificate.

INVALIDCARD: The customer's certificate was not recognised by the collector.

EXPIREDCARD: The customer's certificate has expired.

REVOKEDCARD: The customer's certificate has been revoked.

The reasons are used by the PTD to select an appropriate error message to display to the customer. On the next poll of the polling loop 717 of the POS system, the POS servlet Sv2 discovers that the state of the transaction has been changed to "authorised", and it reports this to the POS system as a confirmation response 730. The confirmation response comprises the result of the transaction, e.g.

```
"<!xml version=1.0/>
  < MeTConfirmationResponse > <RESULT>OK</RESULT>
  </ MeTConfirmationResponse >."
```

The POS system may now print a paper receipt and send a receipt notification request 731 to the POS servlet Sv2, e.g.

"http://someserver/servlets/CashRegisterServlet/receipt?cardno=20001023123456." In response to the receipt notification request 731, the POS servlet Sv2 updates the state of the transaction to "completed" (step 732) and returns a receipt notification response 733 to the POS system, e.g.

```
"<!xml version=1.0/>
  < MeTReceiptNotificationResponse > <RESULT>OK</RESULT>
  </ MeTReceiptNotification Response >."
```

Figure 7B:
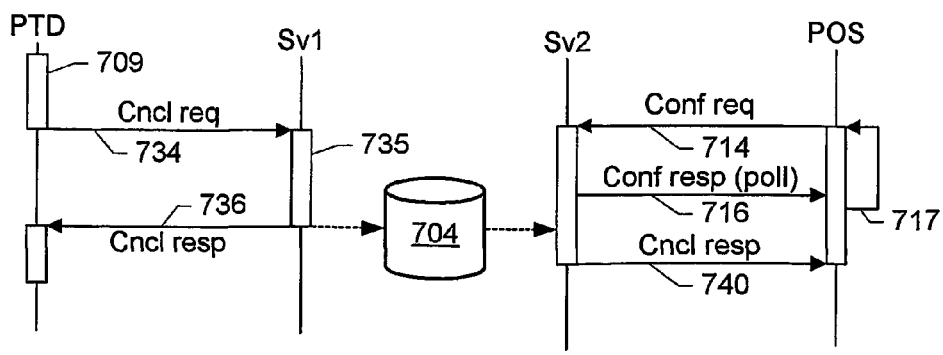
Figure 7C:
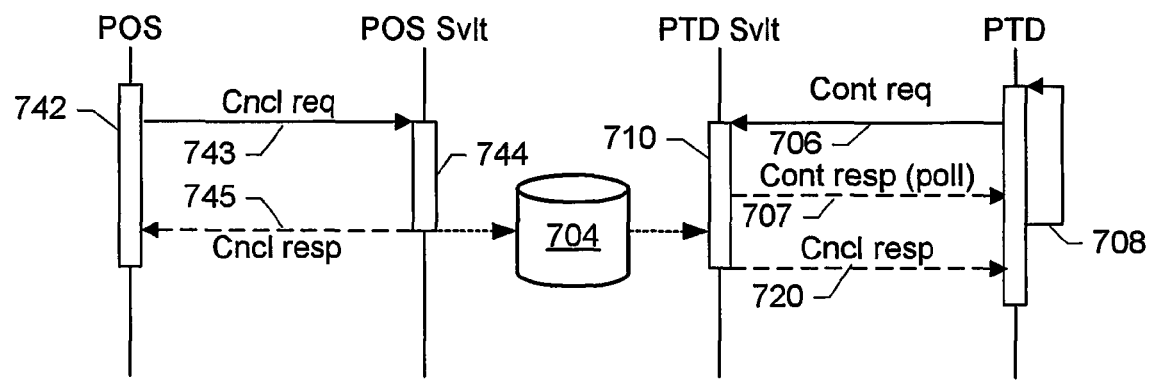

FIGS. 7*b*-*c* illustrate examples of the message flow in cases where the transaction is aborted. In the example of FIG. 7*b*, the customer cancels the transaction before it reaches the "signed" state. When the customer decides to cancel an ongoing transaction, the PTD sends a cancel request 734 to payment application, causing it to inform the POS system that the transaction has been terminated before it was completed. More specifically, when the PTD sends the cancel request 734 to the PTD servlet Sv1, the servlet Sv1 updates the database 704 accordingly and sends a response 736 to the PTD. For example, the cancel request 734 may be a WSP GET request comprising the transaction ID and the reason for the cancel request in the query part of the URL, e.g. "http://someserver/servlets/PTDServlet?id=20001012123456&abort=userCancel." The cancel response may just be an empty message. The PTD servlet may also return an empty message in response to an initialisation, contract, or payment request to indicate that the transaction has been terminated before it was completed. On the next poll of the polling loop 717 of the POS system, the POS servlet Sv2 discovers that the transaction has been cancelled, and it informs the POS system about the cancellation via a cancel response 740.

In the example of FIG. 7*c*, the cashier cancels the transaction before it reaches the "signed" state. When the cashier decides to cancel an ongoing transaction, the POS system sends a cancel request 743 to the POS servlet Sv2 of the payment application, including the ID of the transaction that is requested to be cancelled, e.g. "http://someserver/servlets/CashRegisterServlet/abort?id=20001023123456." The POS servlet Sv2 updates the database 704 accordingly (step 744), causing the PTD servlet Sv1 to inform the PTD via a Cancel response 720 about the result of the abort, i.e. that the transaction has been terminated before it was completed, e.g.

```
"<!xml version=1.0/>
  <MeTCancelResponse> <RESULT>OK</RESULT>
  </ MeTCancelResponse >."
```

Other failure and/or cancel scenarios include the following examples:

The payment application cancels the transaction before it forwards the contract to the collector. For example, the cancellation may be caused by an invalid contract or invalid customer certificates. When the application cancels the ongoing transaction, it sends cancel responses to the PTD and POS system, respectively. The cancel responses may be given in response to any PTD or POS request.

The collector may decline authorisation. In this case, a negative payment response is sent to the PTD, and a negative confirmation response is sent to the POS.

A communication failure may have occurred, e.g. due to a failure to connect to a remote system or due to garbled, incomplete, or invalid contents of a message. Preferably, it is the responsibility of the PTD and POS system to respond gracefully to the first category of failures. When this happens, the payment application should ensure that the ongoing transaction is marked as failed after a given amount of time. Garbled, incomplete, or invalid request and response messages should be handled gracefully by the PTD, POS, collector, and application. Preferably, this includes reporting the fault to the customer and/or cashier and to respond with cancel response to a request.

A time-out may occur. In order to guard against system lock-up caused by communication failures or human error, the payment application may impose a time limit on a transaction, i.e. a maximum time between the transaction is created and until it has been cancelled or completed. If a transaction times out, the application should respond with cancel messages to the PTD and POS.

If the PTD crashes in the middle of a transaction, the connection to the merchant system will be lost. When/if the connection is re-established, the PTD will start a new session with the merchant system.

Consequently, the interrupted transaction will time out if it has not reached the "signed" state. If the contract has been signed, and the collector grants authorisation, the customer will receive a receipt from the POS system as notification that the transaction was completed. The customer will not be issued a new contract in this case.

If the payment application crashes in the middle of a transaction, it will treat all transactions, which have not reached "completed" state, as aborted. Once the application restarts, the interrupted transactions will be closed and cancel messages will be sent to the POS and PTD (if they have not discovered the crash). This ensures that capture is not performed against incomplete transactions, i.e. If the customer has not received a receipt from the POS system, capture will not be performed.

If the POS system crashes in the middle of a transaction, the transaction will time out, causing cancel messages to be sent to the PTD. Because the transaction did not reach "completed" state, capture will not be performed for it.

If the collector crashes before an authorisation request has been fully processed, the application does not receive an authorisation response. This will cause the transaction to time out and consequently cancel messages will be sent to the PTD and POS system.

In the above scenarios, if the customer has signed an electronic contract before the transaction aborts, the POS system should print a negative paper receipt to be used by the customer as proof that the signature is not going to be used. In the scenario where the payment application crashes, this may require that the POS system is adapted to time out after a predetermined time while waiting for the payment application. In the scenario where the POS crashes, a receipt may be issued by other means, e.g. manually.

Figure 7D:
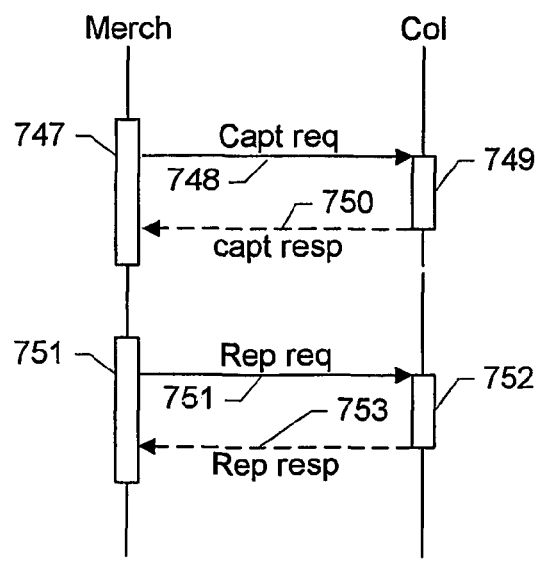

FIG. 7d illustrates an example of a message flow in connection with the capture of a payment. The messages are exchanged between the merchant system Sv and the collector system Col. Preferably, the merchant initiates capture of transactions, typically at the end of a business day. This causes the collector to create a batch job containing authorised transactions for the merchant, and to submit this batch job to the acquirer system. In the example of FIG. 7d, when the merchant system Sv initiates capture, it uses a secure (SSL v.3) HTTPS POST request 748 to transmit the capture parameters to the collector as a signed XML document in the request body. Preferably, the document contains sufficient information to prove that capture has been requested for a particular set of transactions, while the exact nature of the transactions may be verified from preceding authorisation requests. For example, the capture request 748 may comprise a list of the transactions, which the merchant wishes to include in the capture, i.e transactions having reached the "completed" state. The signed document and the merchant's certificate are encoded according to PKCS#7. The document may comprise the following elements:

ACCEPTOR: Identification of the merchant extracted from the merchant certificate.

TRANSACTION: ID of transactions to be included in the capture.

An example of a capture request comprising the above fields is:

```
"<!xml version=1.0/>
<MeTCaptureRequest>
    <ACCEPTOR>74967396749673967385</ACCEPTOR>
    <TRANSACTION>20001107034512</TRANSACTION>
    <TRANSACTION>20001107034513</TRANSACTION>
    <TRANSACTION>20001107034514</TRANSACTION>
</MeTCaptureRequest>."
```

Again, in the above example, it is assumed that the merchant can be uniquely identified from the ACCEPTOR element. The collector should compare the ACCEPTOR element with the contents of the certificate and verify the identity of the merchant.

The collector system Col processes the request (step 749) and replies by sending a capture response 750 to the merchant system Sv, comprising a document which contains sufficient information to prove, that capture has been initiated for a particular set of transactions. For example, the document may be an XML document signed and encoded together with the collector's certificate in PKCS#7 format. The XML document may comprise the following elements:

ID: Capture ID, e.g. a 14 digit integer, e.g. made up of a 4-digit year, a 2-digit month, a 2-digit day, and a 6-digit serial number.

ACCEPTOR: Identification of the merchant extracted from the merchant certificate.

STATUS: Indicates whether capture was accepted. Examples of status values include "Capture in progress", "unknown merchant", "merchant certificate invalid", "merchant certificate expired", "merchant certificate revoked", "bad merchant signature", "system error".

TRANSACTION: ID of transactions included in the capture.

An example of a capture response comprising the above fields is:

```
"<!xml version=1.0/>
<MeTCaptureResponse>
    <ID>20000912000010</ID>
    <ACCEPTOR>74967396749673967385</ACCEPTOR>
    <STATUS>0<STATUS>
    <TRANSACTION>20001107034512</TRANSACTION>
    <TRANSACTION>20001107034513</TRANSACTION>
    <TRANSACTION>20001107034514</TRANSACTION>
</MeTCaptureResponse>."
```

The response 750 tells the merchant system whether the capture request was accepted, thereby indicating whether a subsequent capture report can be obtained from the collector system. The capture report tells the merchant that money has been transferred to the account of the business or, in case of failures, what has gone wrong. It is advantageous to provide both a capture response and a capture report, because the acquirer system may need a significant amount of time to process the batch job, i.e. the capture request would time out before the acquirer system could respond to the collector. For example, the merchant system may use a HTTPS POST request 751 to request a capture report comprising the capture ID and an "ACCEPTOR" field as described above, e.g.

```
"<!xml version=1.0/>
<MeTReportRequest>
    <ID>20000912000010</ID>
    <ACCEPTOR>74967396749673967385</ACCEPTOR>
</MeTReportRequest>."
```

The corresponding report is returned in a response 753 which may comprise a signed XML document, encoded together with the collector's certificate in PKCS#7 format and comprising the following fields ID: Capture ID.

ACCEPTOR: Identification of the merchant extracted from the merchant certificate.

STATUS: Indicates whether the capture succeeded.

INFO: Additional information if the capture was rejected, e.g. a text string.
CURRENCY: The currency of credit and debit.
CREDIT: Total amount transferred to the merchant's account.
DEBIT: Total amount deducted from the merchant's account.

An example of a report response comprising the above fields is:

```
"<!xml version=1.0/>
<MeTReportResponse>
    <ID>20000912000010</ID>
    <ACCEPTOR>74967396749673967385</ACCEPTOR>
    <STATUS>0<7STATUS>
    <CURRENCY>USD</CURRENCY>
    <CREDIT>120000</CREDIT>
    <DEBIT>0</DEBIT>
</MeTReportResponse>."
```

Should the application crash before a capture response has been received from the collector, the capture request may be retransmitted. The collector may respond with a capture response message containing the transactions of the original capture request, even though new transactions have been added to the new request. This ensures that an already submitted batch job can be processed. The merchant application should detect the difference between the request and the response and generate a new capture request containing the transactions not included in the first batch job. Should the application crash before a capture report has been received from the collector, the report request may be retransmitted. The merchant application may request a report for a given batch job as many times as it wants. If the collector crashes in the middle of a capture request, the merchant system will not receive a capture response. Consequently, the request will time out, and a new request can be made, as described above.

In the above examples, the interactions between the PTD and the merchant system are based on WAP connections. The connection may use transport layer security (WTLS) class 2 or class 3. Class 2 allows the PTD to authenticate the server's identity, whereas class 3 allows the server to authenticate the customer's identity. The latter may not be necessary as the signature on the contract serves as identification of the customer. To ensure sufficient encryption strength, the cipher key size should, preferably, be 128 bit and the public RSA key size 1024 bit. CA public RSA keys are preferred to be 2048 bits long. The MIME type of all responses is "text/plain". Furthermore, in the above examples, the interactions between the application and the POS system is based on HTTP connections. It is assumed that the LAN provides sufficient protection of the connections, i.e. encryption is not necessary. The interactions between the merchant system and the collector are based on HTTPS connections. Security is provided using SSL v.3 to provide privacy and integrity through encryption. To ensure sufficient encryption strength, the cipher key size should be 128 bit and the public RSA key size 1024 bit. CA public RSA keys are to be 2048 bits long. Alternatively or additionally, other protocols and security standards may be used within the scope of the invention.

It should be noted, that the flow described in connection with the examples of FIGS. 7a-d is based on polling. The use of polling solves the problem that WSP and HTTP GET requests may time out. Consequently, a response to a GET request may not be arbitrarily delayed, thereby limiting the maximum waiting time which may be implemented. In particular, this is a disadvantage in cases where the execution of the flow requires human interaction, i.e. where fixed response times cannot be guaranteed. The use of polling solves this problem, as the waiting is implemented in the requesting device, allowing the application to respond immediately to a GET request. Alternatively, the timeout problem with WSP requests can be avoided using WAP push technology by pushing an URL to the PTD. This has the further advantage that it avoids unnecessary delays of the polling technique. Using polling, in a worst case scenario, the maximum sleep intervals of all polling loop should be added to the time it takes to complete a transaction.

The above example embodiments have primarily been described in connection with examples employing the technologies Bluetooth, WAP, and HTTP. However, other technologies as well as other ways of providing security and performing the transaction are understood to be within the scope of the described technology.

The invention claimed is:

1. A method of processing a transaction request by a first customer mobile terminal at a transaction system, the method comprising:
    establishing via at least one wireless access point respective wireless communications links between the transaction system and a number of customer mobile terminals corresponding to respective customers, the transaction system including a point of sale system and a server connected to the point of sale system and to the at least one wireless access point;
    wirelessly transmitting a transaction request from the first customer mobile terminal to the server via said at least one wireless access point;
    in response to the transaction request, generating by the server an identifier identifying the first customer mobile terminal;
    transmitting the identifier from the server to the first customer mobile terminal via said at least one wireless access point; and
    identifying at the point of sale system the first customer mobile terminal among the number of customer mobile terminals having established a respective wireless communications link as being a customer mobile terminal carried by a selected customer by communicating the identifier to the point of sale system, wherein identifying the first customer device includes:
        assigning respective identifiers to each of the number of customer mobile terminals by the transaction system, a first identifier being assigned to the first customer mobile terminal;
        transmitting the respective identifiers from the transaction system to the corresponding customer mobile terminals via the corresponding wireless communications links; and
    using the first identifier to identify the first customer mobile terminal carried by the selected customer, wherein the first identifier has a length determined by the transaction system based on the number of customer mobile terminals having established a wireless communications link with the transaction system.

2. A method according to claim 1, wherein the first identifier is a sequence of alphanumeric characters.

3. A method according to claim 2, wherein the first identifier comprises less than five characters.

4. A method according to claim 1, wherein using the first identifier to identify the first customer device comprises:
    presenting the first identifier to the selected customer by the first customer device; and receiving a first input by the transaction system from a user of the transaction system, the first input being indicative of the first identifier.

5. A method according to claim 1, further comprising:
storing in a storage medium a set of customer data items in relation to a set of device data items, the set of customer data items being indicative of a set of registered customers and the set of device data items being indicative of a corresponding set of customer devices;
presenting to a user of the transaction system selected ones of the set of customer data items related to the customer devices having established respective wireless communications links; and
receiving a second input by the transaction system from the user of the transaction system, the second input being indicative of a selected one of the presented customer data items.

6. A method according to claim 5, wherein presenting selected ones of the set of customer data items further comprises selecting a subset of the number of customer devices based on additional information about the customer devices.

7. A method according to claim 6, wherein the additional information comprises reception characteristics of at least the established wireless. communications links.

8. A method according to claim 5, wherein presenting selected ones of the set of customer data items further comprises presenting the selected customer data items in a predetermined order based on additional information about at least one of the customer data and the customer devices.

9. A method according to claim 1, wherein the transaction includes a transfer of a predetermined amount from a customer account to a recipient account, and the method further comprises:
transmitting a second data signal indicative of the predetermined amount from the transaction system to the first customer device via the corresponding wireless communications link;
receiving a third input from the selected customer to the wireless customer device, the third input being indicative of an authorization to transfer the predetermined amount from the customer account to the recipient account;
transmitting the first data signal in response to the third input;
initiating transfer of the predetermined amount by the transaction; and
system in response to the received first data signal.

10. A method according to claim 1, wherein at least a first one of the respective wireless communications links is a Bluetooth link.

11. A computer program embodied in a computer-readable medium comprising program code for performing the steps of claim 1 when said computer program is run on a computer.

12. A method according to claim 1, wherein further comprising:
transmitting the identifier from the point of sale system to the server;
based on the received identifier, creating a contract by the server; and
transmitting the contract to the first customer device in order for the customer of the first customer mobile terminal to approve the transaction request.

13. A transaction system for processing a transaction request to be approved by a first customer mobile terminal, the transaction system comprising:

a transceiver included at a wireless access point for establishing respective. wireless communications links between the transaction system and a number of customer mobile terminals;
wherein the transaction system includes a point of sale system;
a server, connected to the point of sale system and to the wireless access point; and arranged to receive a transaction request wirelessly transmitted from a first customer mobile terminal via the wireless access point,
wherein the server is arranged to generate a first identifier identifying the first customer mobile terminal in response to the transaction request and to transmit the identifier to the first customer mobile terminal via the wireless access point;
wherein the point of sale system is arranged receive the first identifier output by the first customer mobile terminal and to identify the first customer mobile terminal among the number of customer mobile terminals having established a respective wireless communications link as being a customer mobile terminal carried by a selected customer based on the first identifier having been output by the first customer mobile terminal,
wherein:
the server is arranged to assign a respective identifier to each of the number of customer mobile terminals;
the transceiver is arranged to transmit the respective identifiers from the transaction system to corresponding customer mobile terminals via the corresponding wireless communications links; and
the first identifier has a length determined by the transaction system based on the number of customer mobile terminals having established a wireless communications link with the transaction system.

14. A transaction system according to claim 13, wherein the server comprises:
a first output for presenting the first identifier to the selected customer; and
a first input for receiving a first input from a user of the transaction server, the first input being indicative of the first identifier.

15. A transaction system according to claim 13, further comprising:
a storage medium arranged to store a set of customer data items in relation to a set of device data items, the set of customer data items being indicative of a set of registered customers and the set of device data items being indicative of a corresponding set of customer mobile terminals;
a second output for presenting selected ones of the set of customer data items to a user of the transaction system; and
a second input for receiving a second input from the user, the second input being indicative of a selected one of the presented customer data items.

16. A transaction system according to claim 13, wherein
the transaction request includes a request to transfer a predetermined amount from a customer account to a recipient account;
the transceiver is adapted to transmit a second data signal indicative of the predetermined amount from the transaction system to the first customer mobile terminal via the corresponding wireless communications link;
the first customer device comprises a third input for receiving a third input from the selected customer, the third input being indicative of an authorization to transfer the predetermined amount from the customer account to the recipient account;

the transceiver is further adapted to transmit the first data signal in response to the third input; and the transaction system further comprises a second server for initiating the transfer of the predetermined amount by the transaction component in response to the received first data signal.

17. A customer mobile terminal for processing a transaction request from a point of sale (POS) transaction system, the customer mobile terminal comprising:

a transceiver for establishing a short-range wireless communications link between the customer mobile terminal and the transaction system via at least one wireless access point, the transaction system including a point of sale system and a server connected to the point of sale system and to the at least one wireless access point; and a processor for assisting the transaction system in identifying the customer mobile terminal among a number of customer mobile terminals having established respective short-range wireless communications links as being a customer mobile terminal carried by a selected customer, wherein the processor is arranged to:

wirelessly transmit a transaction request via the wireless access point to the server;

receive an identifier identifying the customer mobile terminal from the server via the wireless access point; and output the received identifier so as to allow the point of sales system to identify the customer mobile terminal among the number of customer mobile terminals having established a respective wireless communications link as being a customer mobile terminal carried by a selected customer based on the identifier having been output by the first customer mobile terminal, wherein a length of the identifier identifying the customer mobile terminal is based on the number of customer mobile terminals having established a wireless communications link with the transaction system.

18. A transaction system for processing a transaction request to be approved by a first customer mobile terminal, the transaction system comprising;

a transceiver at a wireless access point for establishing respective wireless communications links between the transaction system and a number of customer mobile terminals;

a point of sale system; and a server, connected to the point of sale system and to the wireless access point, arranged to receive a first transaction request wirelessly transmitted from the first customer mobile terminal via the wireless access point, and in response to the first transaction request, to generate a transaction record comprising first identifier and store the transaction record in a database, the database storing a number of transaction records indicative of respective customer mobile terminals having transmitted a transaction request, wherein the server is further arranged to, in response to a second transaction request from the point of sale system, present the number of transaction records and associated customer information on the point of sale system;

wherein the point of sale system is arranged to identify the first customer mobile terminal among the number of customer mobile terminals having established respective wireless communications links as being a customer device carried by a selected customer based on the associated customer information presented on the point of sale system including the first identifier; and wherein a length of the first identifier is based on the number of customer mobile terminals having established a wireless communications link with the transaction system.

19. A method of processing a transaction request by a first customer mobile terminal at a transaction system; the method comprising:

establishing respective wireless communications links between the transaction system and a number of customer mobile terminals corresponding to respective customers via at least one wireless access point, the transaction system including a point of sale system and a server connected to the point of sale system and to the at least one wireless access point;

wirelessly transmitting a first transaction request from the first customer mobile terminal to the server via said at least one wireless access point;

in response to the first transaction request, generating by the server a transaction record comprising an identifier and storing the transaction record in a database, the database storing a number of transaction records indicative of respective customer mobile terminals having transmitted a transaction request;

communicating a second transaction request from the point of sale system to the server;

in response to the second transaction request, presenting the number of transaction records and associated customer information on the point of sale system;

identifying at the point of sale system the first customer mobile terminal among the number of customer mobile terminals based on the associated customer information presented on the point of sale system.

20. A method according to claim 19, further comprising:

transmitting the identifier from the point of sale system to the server;

based on the received identifier, creating a contract by the server; and transmitting the contract to the first customer mobile terminal in order for the customer of the first customer mobile terminal to approve the transaction request.

21. A method according to claim 19, wherein the associated customer information presented on the point of sale system includes an identifier associated with the first customer mobile terminal and a length of the identifier is based on the number of customer mobile terminals having established a wireless communications link with the transaction system.

* * * * *

UNITED STATES PATENT AND TRADEMARK OFFICE
CERTIFICATE OF CORRECTION

| | | |
|---|---|---|
| PATENT NO. | : 7,587,196 B2 | Page 1 of 1 |
| APPLICATION NO. | : 10/472966 | |
| DATED | : September 8, 2009 | |
| INVENTOR(S) | : Hansen | |

It is certified that error appears in the above-identified patent and that said Letters Patent is hereby corrected as shown below:

In Column 7, Line 36, delete "like the" and insert -- like. The --, therefor.

In Column 15, Line 16, delete "SV1" and insert -- Sv1 --, therefor.

In Column 25, Line 25, in Claim 7, delete "wireless." and insert -- wireless --, therefor.

In Column 26, Line 2, in Claim 13, delete "respective." and insert -- respective --, therefor.

Signed and Sealed this

Sixteenth Day of March, 2010

David J. Kappos
*Director of the United States Patent and Trademark Office*